United States Patent
Nelson et al.

(10) Patent No.: US 7,150,921 B2
(45) Date of Patent: Dec. 19, 2006

(54) BI-LAYER HVOF COATING WITH CONTROLLED POROSITY FOR USE IN THERMAL BARRIER COATINGS

(75) Inventors: Warren Arthur Nelson, Clifton Park, NY (US); Jon Conrad Schaeffer, Greenville, SC (US); Sharon Trombly Swede, Easley, SC (US); David Vincent Bucci, Simpsonville, SC (US); Joseph Debarro, Greer, SC (US); Terry Howard Strout, Simpsonville, SC (US); Tyrone Robert Mortensen, Greenville, SC (US)

(73) Assignee: General Electric Company, Schenectady, NY (US)

( * ) Notice: Subject to any disclaimer, the term of this patent is extended or adjusted under 35 U.S.C. 154(b) by 97 days.

(21) Appl. No.: 10/847,357

(22) Filed: May 18, 2004
(Under 37 CFR 1.47)

(65) Prior Publication Data

US 2005/0260434 A1 Nov. 24, 2005

(51) Int. Cl.
*B32B 15/04* (2006.01)
*B32B 15/09* (2006.01)
*B32B 15/20* (2006.01)
*C23C 4/06* (2006.01)
*C23C 4/18* (2006.01)

(52) U.S. Cl. ............... 428/626; 428/613; 428/650; 428/666; 428/632; 428/458; 428/334; 428/332; 427/455; 427/456; 427/383.1; 427/419.1

(58) Field of Classification Search ............ 428/624, 428/626, 632, 666, 667, 610, 613, 650, 651, 428/652, 680, 681, 457, 678, 334, 332, 627, 428/458, 938; 416/241 R, 241 A, 241 B; 427/450, 451, 453, 455, 456, 383.1, 419.2, 427/419.7, 419.1
See application file for complete search history.

(56) References Cited

U.S. PATENT DOCUMENTS

| 5,817,372 | A | 10/1998 | Zheng ................. 427/456 |
| 5,981,088 | A | 11/1999 | Bruce et al. ........... 428/633 |
| 6,165,628 | A | 12/2000 | Borom et al. .......... 428/610 |
| 6,274,201 | B1 | 8/2001 | Borom et al. .......... 427/454 |
| 6,368,672 | B1 | 4/2002 | Thompson et al. ..... 427/452 |
| 6,660,405 | B1 * | 12/2003 | Lau et al. ............. 428/613 |
| 2003/0054196 | A1 * | 3/2003 | Lau et al. ............. 428/655 |

OTHER PUBLICATIONS

European Search Report, dated Mar. 30, 2006.

* cited by examiner

*Primary Examiner*—Michael E. Lavilla
(74) *Attorney, Agent, or Firm*—Nixon & Vanderhye

(57) ABSTRACT

A bi-layer bond coating for use on metal alloy components exposed to hostile thermal and chemical environment, such as a gas turbine engine, and the method for applying such coatings. The preferred coatings include a bi-layer bond coat applied to the metal substrate using high velocity oxy-fuel (HVOF) thermal spraying. Bi-layer bond coatings in accordance with the invention consist of a dense first inner layer (such as iron, nickel or cobalt-based alloys) that provides oxidation protection to the metal substrate, and a second outer layer having controlled porosity that tends to promote roughness, mechanical compliance, and promotes adherence of the thermal barrier coating (TBC). Preferably, the outer, less dense layer of the bi-layer bond coat is formed from a mixture of metallic powder and polyester to adjust and control the porosity, but without sacrificing mechanical compliance.

11 Claims, 3 Drawing Sheets

Baseline: HVOF/APS

HVOF/ HVOF + 5% polyester

HVOF/ HVOF + 15% polyester

HVOF/ HVOF + 9% polyester

BI-LAYER HVOF COATING WITH CONTROLLED POROSITY FOR USE IN THERMAL BARRIER COATINGS

BACKGROUND OF THE INVENTION

The present invention relates to protective coatings for metal alloy components, such as the working components of gas turbine engines that are exposed to high temperature gas environments and severe operating conditions. More particularly, the invention relates to a new type of protective bond coating that includes a bi-layer bond coat applied to a metal substrate using high velocity oxy-fuel ("HVOF") thermal spraying. In one embodiment, bond coatings in accordance with the invention can be used in combination with a thermal barrier coating ("TBC"). However, the invention can also take other forms, such as a stand alone overlay coating.

Exemplary bi-layer bond coatings in accordance with the invention include a dense first inner layer that provides oxidation protection to the metal substrate, and a second outer layer having controlled porosity that tends to promote roughness and aids adherence of the TBC to the bond coat. Preferably, the second less dense layer of the bi-layer bond coat is formed from a mixture of metallic powder and polyester to control and adjust the porosity to the desired level. Together, the layers enhance adherence between the bond coat and TBC and thereby improve the overall life of the coating system.

The present invention also relates to a new method for forming a bi-layer bond coating in which both layers of the coating are applied to the metal alloy components using HVOF thermal spraying. As discussed below, HVOF has not been used in the past for coatings containing polyester to control coating porosity, particularly as part of a multiple layer bond coating applied to metal substrates.

The invention is particularly well suited for use with gas turbine engine components since it is known that the operating conditions for such components can be thermally and chemically severe. By necessity, the surfaces of the metal substrates used to form the turbine, combustor and augmentor components must exhibit greater than average mechanical strength, durability, oxidation resistance, and erosion resistance in hostile, high temperature gas environments.

In recent years, significant advances have been made in gas turbine systems by incorporating high temperature alloys of iron, nickel and cobalt-based compositions in the base coatings applied to the metal substrate of the turbine components, particularly buckets and nozzles. For example, some prior coating systems have included a top layer comprising a thermal-insulating ceramic (typically referred to as a thermal barrier coating or "TBC"), together with an environmentally-resistant lower bond coat adhered to the alloy metal substrate. Metal oxides, such as zirconia ($ZrO_2$) that are partially or fully stabilized by yttria ($Y_2O_3$), magnesia (MgO) or another oxide, have been used to form the thermal-insulating ceramic layer using air plasma spray ("APS"), vacuum plasma spray ("VPS") or physical vapor deposition techniques such as electron beam physical vapor deposition ("EBPVD"). See commonly-assigned U.S. Pat. No. 5,981,088 (disclosing the use of yttria-stabilized zirconia deposited by EBPVD in order to improve thermal cycle fatigue properties). See also, U.S. Pat. No. 5,817,372 (describing a process for depositing a bond coat for a thermal barrier coating system); U.S. Pat. No. 6,165,628 (disclosing protective coatings for metal-based substrates and related processes); U.S. Pat. No. 6,274,201 describing protective coatings for metal-based substrates and related processes); and U.S. Pat. No. 6,368,672 (disclosing a method for forming a thermal barrier coating system for turbine engine components).

The objectives of an effective bond coat on metal substrates are two-fold. First, the coating must form a dense, protective and adherent layer that guards the underlying base material against oxidation, corrosion, and degradation. Second, the coating should serve to promote adherence of the ceramic layer. For thermal spray coatings, a high degree of surface roughness is required to provide mechanical interlocking; EB-PVD TBCs require much smoother interface roughness to allow more uniform growth of the TBC columns. Bond layers are typically made of alloys such as MCrAlY, where M represents a metal such as Ni, Co, or Fe. Aluminide bond coats are often used for EB-PVD TBC. As bond coat compositions have become more complex, it has become increasingly difficult to obtain both the higher required strength levels (particularly at maximum gas turbine operating temperatures) and a satisfactory level of corrosion and oxidation resistance. The trend in recent years towards higher gas turbine firing temperatures has made the oxidation, corrosion and degradation problems even more difficult.

Typically, bond coats used in prior systems have been based on oxidation-resistant alloys such as MCrAlY or a diffusion aluminide or platinum aluminide that forms an oxidation-resistant intermetallic. The dense coatings formed from such compositions protect the underlying alloy by forming an oxidation barrier for the substrate at the outermost surface of the bond coat. This oxidation barrier is typically a dense adherent aluminum oxide layer (sometimes called an "alumina scale") that forms at the elevated temperatures. The oxide scale tends to protect the bond coat from continued oxidation. Plasma-sprayed ceramic layers, for example, adhere well to the bond coat if the bond has a relatively rough surface. The rough surface of the bond coat enhances mechanical adherence though interlocking of the bond coat and TBC microstructures.

A description of this known relationship between thermal insulating ceramic layers and metal substrate bond coats appears in commonly-owned U.S. Pat. No. 5,817,372 to Zheng, the disclosure of which is hereby incorporated by reference. The '372 patent notes that the strength and integrity of the bond between a thermal insulating ceramic layer and bond coat often depends on the deposition technique involved. That is, the structure and physical properties of bond coats are dependent on the process and equipment by which they are deposited.

In the past, bond coats have been applied by thermal spraying, e.g., APS, VPS and HVOF techniques, all of which entail deposition of the bond coat using a metal powder. While bond coats deposited by such techniques have been employed successfully, each has distinct advantages and disadvantages, depending on the desired application. For example, with VPS, very little oxidation of the metal particle occurs during deposition, and thus the resulting bond coat tends to be dense, relatively free of oxides, and exhibits a high temperature capability due to the inherent ability to grow a continuous protective oxide scale. VPS processes have a relatively low heat capacity to melt the spray powder and thus typically employ powders having very fine particle size distribution. As a result, VPS bond coats tend to be dense, but have relatively smooth surfaces (typically 200 to 350 microinches, i.e., about 4 to about 9 μm)). Consequently, many plasma-sprayed ceramic layers do not adhere well to underlying VPS bond coats. U.S. Pat. No. 5,817,372 describes a VPS coating with improved roughness generated by use of coarse powders that do not completely melt during the deposition process.

Air plasma spray (APS) has a high heat capacity that enables the melting of relatively large particles and permits the use of metal powders that yield bond coats having a somewhat rougher surface than those formed by VPS. Thus, the adhesion of a ceramic layer to an APS bond coat is normally enhanced by the rough APS bond coat surface. The particle size distribution of such powders is also broad, thereby allowing the finer particles to partially fill the interstices between larger particles and reduce porosity. However, the finer particles used in APS are prone to oxidation during the spraying process, typically resulting in a bond coat having a very high oxide content. The entrapped oxides and the larger particle size utilized in APS coatings tend to promote porosity in the coating. Consequently, APS bond coats inherently contain relatively high levels of oxides and are less dense than VPS bond coats, making them more prone to oxidation than VPS coats.

The prior art methods used to apply bond coats fall into three general categories: (1) fully dense coats produced by APS, VPS, or HVOF processes; (2) fully porous coats formed by APS processing; or (3) a bi-layers of dense coating followed by one or more porous layers. The bi-layer coatings are oftentimes produced by two different processes (typically HVOF or VPS for the dense layer and APS for the porous layer). The bi-layer structure can also be formed by modification of particle size and/or spray parameters to create a rougher or more porous outer layer. As noted above, heretofore HVOF has not been used to form both the dense and porous layers.

The use of two different thermal spray processes to form the bi-layer bond coating creates an undesirable complication in the manufacturing process. Typically, the known HVOF/APS bi-layer coatings require an intermediate vacuum heat treatment after the HVOF layer is applied. The '732 patent identified above discusses one such bi-layer bond coating system consisting of two HVOF layers utilizing different powder sizes to provide increased roughness at the surface. However, the outer layer is close to maximum density and lacks the mechanical advantages of a more porous coating layer. It is now recognized that the use of a single HVOF system to apply both the dense and porous layers of the bi-layer coating could greatly simplify the manufacturing process and lead to cost reductions due to reduced cycle time. A reduction in cycle time could also be achieved by eliminating the intermediate vacuum heat treatment of the HVOF described in the '372 patent.

Although some prior art air plasma sprayed coatings have used polyester powder as a fugitive filler in order to adjust and control porosity (for example, to produce abradable surface coatings), the use of polyester filler to create porosity in bi-layer HVOF bond coatings is not known. Bond coats deposited by HVOF techniques are known to be very sensitive to the particle size distribution of the powder because of the relatively low spray temperature of the HVOF. Thus, the thermal spray parameters normally must be adjusted for powders having a very narrow range of particle size distribution. Further, in order to produce an effective bond coat using an HVOF process, a coarse powder must be used in order to achieve adequate surface roughness. However, because coarse particles cannot typically be fully melted at the lower HVOF temperature parameters, HVOF bond coats made from coarse powders typically exhibit higher porosity and poorer bonding between particles. HVOF coatings made from fine powders are more dense but lack adequate roughness for good TBC adherence.

Thus, despite recent developments in bond coatings, including some bi-layer coatings used in combination with TBC, there remains a need in the art for improved protective coatings on metal alloy components exposed to high temperature environments in gas turbine engine components. The need also exists for improved methods of applying such coatings to key turbine components exposed to hostile conditions at high temperatures.

BRIEF SUMMARY OF THE INVENTION

The present invention provides a new bond coating for use with thermal barrier coatings on metal alloy components used in hostile environments, such as nozzles, buckets, shrouds, airfoils, and other components found in the hot gas paths of gas turbine engines. Bond coatings in accordance with the invention can thus be applied to the components in gas turbine "hot sections," including the combustor. The same methods can be used in other environments, such as augmentor components in aircraft engines. Thus, the coatings are not restricted to use on industrial gas turbines, but can be also be applied to selected components in diesel and other internal combustion engines. Although the present invention normally forms a bond coating for use with thermal barrier coatings ("TBC"), it can also be used to create a stand alone metallic overlay coating, i.e., without any ceramic top layer.

As noted above, improved bond coatings in accordance with the invention are preferably formed by using a bi-layer bond coat applied entirely by HVOF thermal spraying. The bi-layer coating consists of a dense inner layer that provides oxidation protection of the metal substrate and an outer layer having controlled porosity that tends to promote roughness and provide improved ductility of the bond coat without sacrificing mechanical compliance, strength or stability. Surprisingly, it has been found that the second outer HVOF layer having controlled porosity can be formed by spraying a mixture of metallic powder and polyester via HVOF.

The present invention thus achieves three desirable attributes of a bond coat for use with TBC systems, namely a layer of high density material to prevent egress of oxygen to the substrate, a high degree of roughness to promote adherence with, for example, the TBC, and controlled porosity for good mechanical compliance. The current state of the art using both HVOF and APS to form a bi-layer bond coat having such attributes would not be considered "manufacturing friendly" due to the need to switch process methods during the course of manufacture, and the need for an intermediate heat treatment after the application of the HVOF layer. Thus, fabricating the dense inner layer and porous outer layer by a single thermal spray method and performing the heat treatment after both layers have been applied by HVOF greatly simplifies the manufacturing process, reduces cost and improves the mechanical properties of the end product.

Bond coating systems in accordance with the invention have also been found to exhibit increased oxidation resistance and hence prolonged cycle life of gas turbine engines. Exemplary HVOF bi-layer coatings according to the invention can be heat treated after the completion of both HVOF layers, thereby simplifying the manufacturing process and reducing cost. As a result, the invention provides for an effective bi-layer bond coat produced solely by HVOF processing that is easier and more cost-effective than existing HVOF/APS systems.

Other objects and advantages of the invention will be better appreciated from the detailed description that follows.

DETAILED DESCRIPTION OF THE INVENTION

As discussed above, bi-layer bond coatings according to the invention include a first dense inner layer and a second rough porous outer layer, with both layers being formed using HVOF. Normally, HVOF is used only for an inner bond coat layer because of its ability to produce very dense coatings. The present invention creates porosity within the outermost HVOF layer by spraying a powder blend of metallic powder and polyester powder. Blends of about 5 to 15 weight % polyester (based on the total weight of the blend) have been specifically evaluated, and the invention contemplates using up to about 20% polyester incorporated into the coating by adjusting the powder sizes, and by including additives to aid the polyester flow and distribution during thermal spraying. The additives assist in improving the dispersion of the polyester within the MCrAly (e.g., NiCrAlY) to thereby prevent clumping. Improved dispersion of the polyester can also be achieved by pre-mixing (dry blending) the coating components in a conventional attritor mill, through spray drying, or even by using an angular-shaped polyester powder. Such techniques assist in thoroughly mixing the polyester and MCrAlY so that the polyester is more evenly dispersed as the coating is applied to the substrate. The mixing also improves flow characteristics during thermal spraying.

In addition to the use of polyester to establish the desired level of porosity within the outermost HVOF layer, the present invention contemplates using other constituents to achieve porosity control within the outermost layer. Such constituents could be carbon powder or other linear polymers or plastics, e.g., polyethylene, polystyrene or nylon.

EXAMPLE 1

A bi-layer coating was fabricated according to the invention using JP5000 HVOF equipment manufactured by TAFA. An initial dense layer of NiCrAlY using Praxair Powder No. Ni211-17 (Bal-Ni-22-Cr-10Al-1-Y) was initially applied to an IN718 substrate (52Ni-19Fe-19Cr-5Nb-3Mo-1Ti) using HVOF.

A second porous layer was then created by spraying a mixture of NiCrAlY, Ni211-17, and polyester powder, namely Metco 600NS powder. The Metco 600NS, Ni211 and IN718 are commercially available materials. After spraying the second coating using HVOF, a metallographic section was prepared and evaluated. The examination confirmed that the outer layer exhibited increased porosity as compared to the more dense inner layer. Using quantitative image analysis, the amount of porosity of the outer layer was determined to be about 3 to 4% of the total layer volume.

Follow-up experiments evaluated other ratios of NiCrAlY/polyester mixtures. Blends of 5, 9, and 15% by weight polyester were fabricated and evaluated, both metallographically and using furnace cycle testing. A baseline system of a conventional HVOF/APS bi-layer was also created for purposes of comparison. The comparative metallography results of the various test coatings are shown below in FIGS. 1 through 5.

Figure 1:
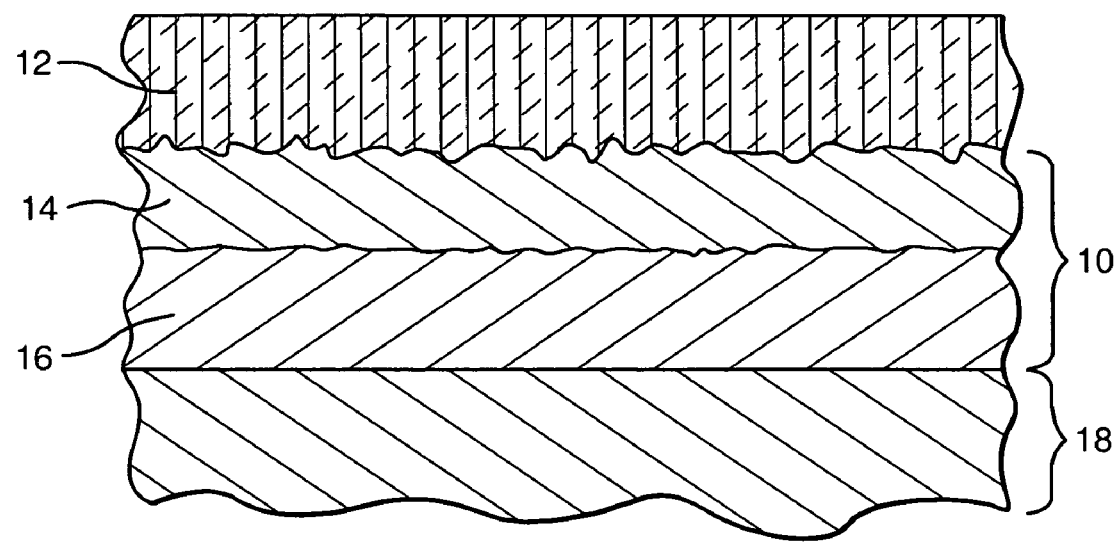
FIG. 1 is a cross-sectional view of a metal substrate (such as a high pressure gas turbine blade) showing an exemplary bi-layer bond coating applied in accordance with the invention using an HVOF deposition process for both bond coat layers.
Figure 2:
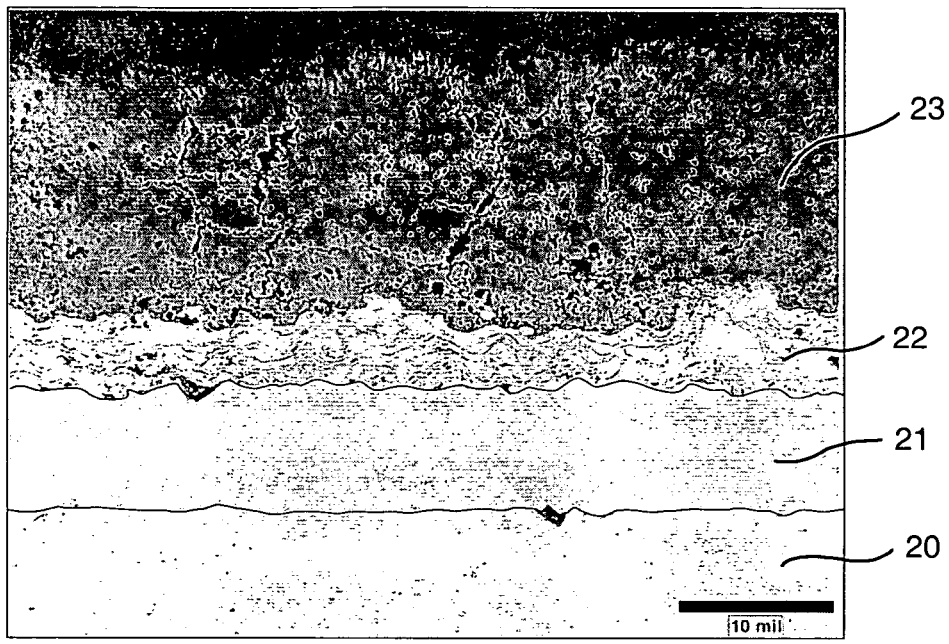
FIG. 2 is photomicrograph depicting the cross section of a conventional prior art bi-layer bond coating applied to a metal substrate (identified by the term "baseline"), in which the first layer was applied using HVOF spraying and the second layer by APS.
Figure 3:
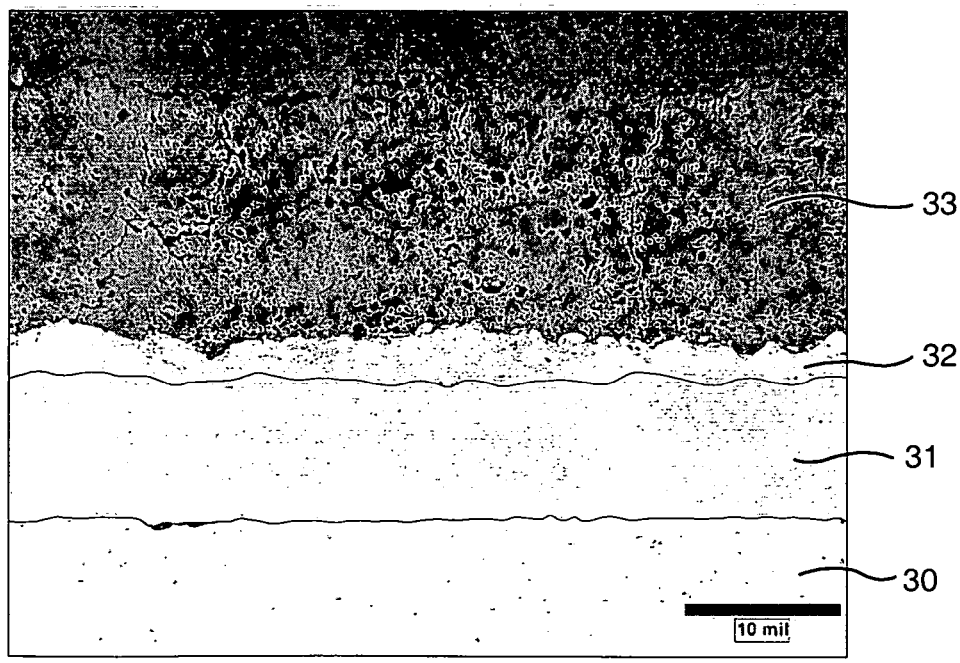
FIG. 3 is a photomicrograph showing the cross section of a second embodiment of a bi-layer bond coating in accordance with the invention with both layers of the bi-layer coating having been applied using HVOF thermal spraying, with the top layer containing about 5% by weight polyester.
Figure 4:
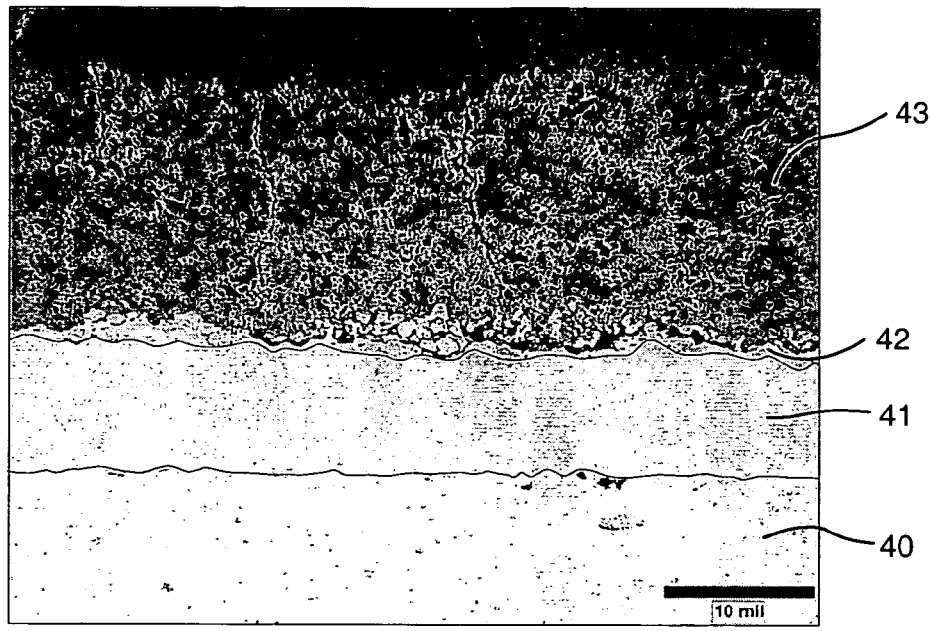
FIG. 4 is a photomicrograph depicting the cross section of a third embodiment of a bi-layer bond coating in accordance with the invention, again with both layers of the bi-layer coating being applied using HVOF spraying and the top layer containing about 15% by weight polyester.
Figure 5:
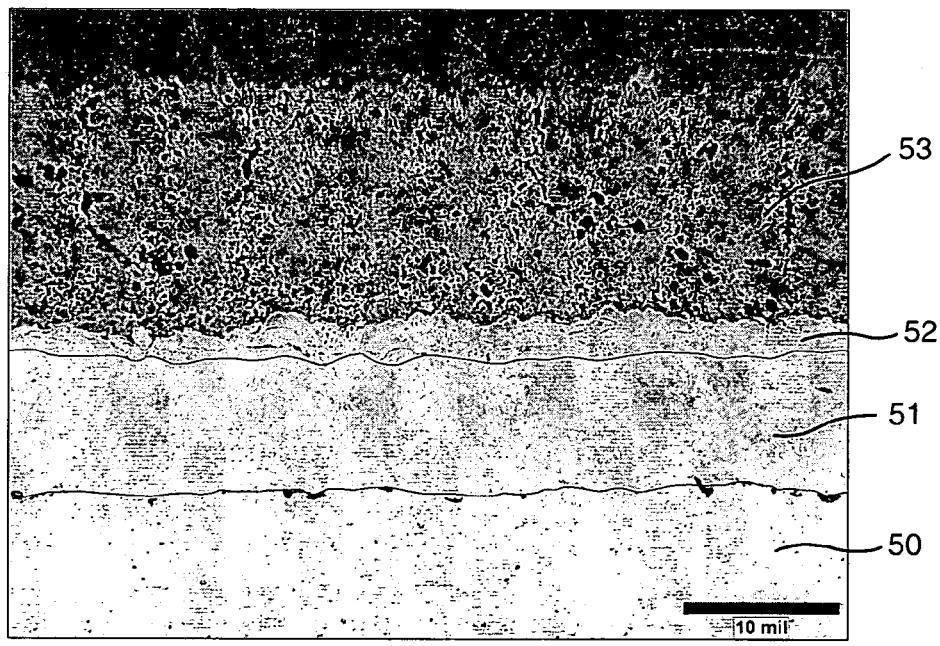
FIG. 5 is a photomicrograph depicting the cross section of a fourth embodiment of a bi-layer bond coating in accordance with the invention, depicting both layers of the bi-layer having been applied using HVOF and the top layer containing about 9% by weight polyester.

FIG. 1 depicts an exemplary bi-layer coating system in accordance with the invention as applied to a substrate using HVOF. The entire coating applied to the substrate includes a thermally insulating ceramic layer 12, a porous bond coating 14 overlaying dense bond coating 16, which together form bi-layer bond coat 10. The bi-layer coating in turn overlies metal alloy substrate 18 that forms the base material of the turbine blade. Preferably, porous bond coating 14 has a thickness of about 3 to 10 mils, dense bond coating 16 has a thickness of about 5 to 15 mils and the bi-layer bond coat 10 ranges in thickness from 8 to 25 mils.

FIGS. 2 through 5 depict various different embodiments of the invention, i.e., with varying levels of polyester in the second, more porous layer as applied using HVOF thermal spraying. The photomicrographs of cross sections of the various embodiments show the same layered configuration from bottom to top, but with varying levels of polyester in the outer (less dense) layers of the different embodiments. The base metal substrate is depicted as items 20, 30, 40 and 50 in FIGS. 2 through 5, respectively. The first dense HVOF layer (which provides oxidation resistance) appears as 21, 31, 41, and 51; the second porous layer (with varying levels of polyester and controlled density) is identified as 22, 32, 42 and 52; and the top thermal-insulating ceramic layer is shown as 23, 33, 43 and 53 in FIGS. 2 through 5, respectively.

In the case of high temperature components of a turbine engine, the substrate 18 may be formed from an iron, nickel or cobalt-base alloy, although it is possible that other high temperature materials could be used. Ceramic layer 12 can be deposited by plasma spraying techniques, such as air plasma spraying or vacuum plasma spraying, also known as low pressure plasma spraying (LPPS). As noted above, a preferred material for the ceramic layer 12 is an yttria-stabilized zirconia (YSZ), although other ceramic materials could be used, including zirconia stabilized by other oxides, such as magnesia (MgO), ceria ($CeO_2$) or scandia ($Sc_2O_3$).

The bond coating depicted in FIGS. 1 through 5 is oxidation-resistant so as to be capable of protecting the underlying substrate from oxidation, while enabling the plasma-sprayed ceramic layer 13 to adhere more tenaciously to the bond coat. In addition, the bond coat is sufficiently dense but with relatively low levels of oxides to further inhibit oxidation of the substrate.

Table 1 below provides comparative evaluations of various HVOF/polyester bonds coats in accordance with the invention. This table presents results of Furnace Cycle Tests, FCT, conducted on TBC systems with the improved bi-layer bond coat of this invention and compares it to a "baseline" of an HVOF/APS bi-layer coating system. The various systems differ by the bond coat application methodology while the TBC portion was constant for all systems. The FCT test is an oxidative, thermal cycle test. Testing is conducted in a bottom loading air furnace with an automated elevator system which raises the specimens into the hot zone and alternatively lowers them to a cooling station where fans direct room temperature air over the specimens. A typical cycle consists of approximately 10 minutes of heat up, 45 minutes hold time at the designated test temperature of 2000 F., and 10 minutes of forced air cooling during which the specimens are cooled to below 400 F. The specimens are inspected once daily for spallation of the TBC and testing discontinued when spallation is greater than 20% of the surface area or the testing may be stopped after a designated number of cycles.

Testing of the HVOF bi-layer systems demonstrated that the system with 9% polyester was approximately equivalent to the baseline system. This system had lives of greater than 620 cycles on N5, the FCT test was discontinued at 620 cycles, and 420 cycles on GTD111 substrate. While this test does not demonstrate clear superiority of the HVOF bi-layer over the baseline system it does show the system has significant potential for further refinement and improvement. Additionally, the advantage of simplified processing by applying both the dense and porous layers by a single process, HVOF, is one important difference between the present invention and conventional bond coat systems.

Evaluations of HVOF/Polyester bond coats

| System ID | % porosity + oxides | FCT life N5 substrate | FCT life GTD111 substrate |
|---|---|---|---|
| A: baseline HVOF/APS (0% polyester) | 19 | 620* | 620* |
| B: HVOF/HVOF 5% polyester | 4.6 | 360 | 346 |
| C: HVOF/HVOF 15% polyester | 44.1 & 7 (high variability by location) | 420 | 313 |
| D: HVOF/HVOF 9% polyester | 6.75 | 620* | 420 |

*test discontinued at 620 cycles

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A coating system for use on metallic components of gas turbine engines comprising:
   a metallic alloy substrate;
   a bi-layer bond coat applied to said alloy substrate, said bond coat having a first, oxidation-resistant layer comprising one or more intermetallics containing aluminum or chromium, and a second, less dense layer comprising polyester and one or more intermetallics containing aluminum and/or chromium, said first and second layers being applied to said alloy substrate by high velocity oxy-fuel (HVOF) thermal spraying; and
   a top layer comprising a thermal-insulating ceramic.

2. A coating system as recited in claim 1, wherein said intermetallics in said first layer comprise MCrAlY, where M is iron, cobalt or nickel.

3. A coating system as recited in claim 1, wherein said one or more intermetallics in said second layer comprise MCrAlY, where M is iron, cobalt or nickel.

4. A coating system as recited in claim 1, wherein said polyester in said second, less dense layer is formed by thermal spraying a powdered blend of polyester and one or more intermetallics, wherein said powdered blend comprises about 5 to 15 weight percent polyester.

5. A coating system as recited in claim 1, wherein said bi-layer bond coat has a total thickness of about 8 to 25 mils.

6. A coating system as recited in claim 1, wherein said first, oxidation-resistant layer has a thickness of about 3 to 10 mils.

7. A coating system as recited in claim 1, wherein said second, less dense layer has a thickness of about 5 to 15 mils.

8. A coating system as recited in claim 1, wherein said second, less dense layer further comprises carbon powder, polyethylene, polystyrene or nylon.

9. A method for forming a protective coating on metallic components of gas turbine engines, comprising the steps of:
   providing a metallic alloy substrate;
   applying a by-layer bond coat over said metallic alloy substrate, said by-layer bond coat having a first oxidation-resistant layer comprising one or more intermetallics containing aluminum or chromium that is applied to said alloy substrate, and a second, less dense layer comprising polyester and one or more intermetallics containing aluminum or chromium, that is applied to said alloy substrate over said first oxidation-resistant layer, said first and second layers being applied to said metallic alloy substrate by high velocity oxy-fuel (HVOF) thermal spraying; and
   applying a top layer comprising a thermal insulating ceramic over said bi-layer bond coat having first oxidation-resistant layer comprising one or more intermetallics containing aluminum or chromium and second, less dense layer comprising polyester and one or more intermetallics containing aluminum or chromium.

10. A method as recited in claim 9, further comprising the step of heat treating said by-layer bond coat after said first and second layers have been applied by HVOF thermal spraying.

11. A method as recited in claim 9, wherein said second less dense layer comprises a blend of intermetallics and polyester, said polyester being applied by thermal spraying a powdered blend of polyester and one or more intermetallics,
   wherein said powdered blend comprises about 5 to 15 weight percent polyester.

* * * * *

UNITED STATES PATENT AND TRADEMARK OFFICE
CERTIFICATE OF CORRECTION

PATENT NO. : 7,150,921 B2  Page 1 of 1
APPLICATION NO. : 10/847357
DATED : December 19, 2006
INVENTOR(S) : Nelson et al.

It is certified that error appears in the above-identified patent and that said Letters Patent is hereby corrected as shown below:

In Claim 9 at lines 38 and 39 and in Claim 10 line 56 the word "by-layer" should read as --bi-layer--

Signed and Sealed this

Tenth Day of April, 2007

JON W. DUDAS
*Director of the United States Patent and Trademark Office*